(12) United States Patent
Liff et al.

(10) Patent No.: US 12,293,652 B2
(45) Date of Patent: May 6, 2025

(54) MULTI-ALARM MONITORING OF ELECTRONIC MERCHANDISE

(71) Applicant: Sennco Solutions, Inc., Plainfield, IL (US)

(72) Inventors: Dale R. Liff, Montgomery, IL (US); Brian Peacock, Melbourne, FL (US)

(73) Assignee: SENNCO SOLUTIONS, INC., Plainfield, IL (US)

( * ) Notice: Subject to any disclaimer, the term of this patent is extended or adjusted under 35 U.S.C. 154(b) by 134 days.

(21) Appl. No.: 17/689,699

(22) Filed: Mar. 8, 2022

(65) Prior Publication Data
US 2022/0284781 A1 Sep. 8, 2022

Related U.S. Application Data (60) Provisional application No. 63/158,154, filed on Mar. 8, 2021.

(51) Int. Cl.
| | |
|---|---|
| *G08B 3/10* | (2006.01) |
| *G06F 3/16* | (2006.01) |
| *G08B 25/00* | (2006.01) |

(52) U.S. Cl.
CPC ................ *G08B 3/10* (2013.01); *G06F 3/16* (2013.01); *G08B 25/005* (2013.01); *G08B 25/008* (2013.01)

(58) Field of Classification Search
CPC ....................................................... G08B 3/10
See application file for complete search history.

(56) References Cited

U.S. PATENT DOCUMENTS

| | | | |
|---|---|---|---|
| 6,285,289 B1 * | 9/2001 | Thornblad ........... | G08B 25/016 340/539.1 |
| 8,115,609 B2 * | 2/2012 | Ketari ................... | H04W 76/19 340/539.11 |

(Continued)

FOREIGN PATENT DOCUMENTS

| | | |
|---|---|---|
| KR | 20170004261 A | 1/2017 |
| WO | 2016011108 A1 | 1/2016 |

OTHER PUBLICATIONS

International Search Report and Written Opinion cited in corresponding application No. PCT/US2022/019364; Jun. 23, 2022; 7 pp.

(Continued)

*Primary Examiner* — Travis R Hunnings
(74) *Attorney, Agent, or Firm* — LEMPIA SUMMERFIELD KATZ LLC (57) ABSTRACT

A system for security monitoring of an electronic device on retail display includes a transmitter configured to transmit a signal, a sensor configured for attachment to the electronic device, the sensor being configured to generate a security event notification based on whether the signal is detected by the sensor, and an alarm controller configured to generate a plurality of alarms upon receipt of the security event notification from the sensor, the plurality of alarms including an audible alarm and a message alarm. The alarm controller is further configured to send the message alarm to initiate a user interface lock on the electronic device in response to the message alarm. The alarm controller is configured to operate in a silent mode in which the audible alarm is not generated upon receipt of the security event notification.

5 Claims, 3 Drawing Sheets

(56) References Cited

U.S. PATENT DOCUMENTS

| | | | | |
|---|---|---|---|---|
| 8,390,450 | B2* | 3/2013 | August | G08B 21/22 |
| | | | | 455/410 |
| 8,648,714 | B2* | 2/2014 | Raduchel | H04W 8/14 |
| | | | | 340/506 |
| 10,002,506 | B2 | 6/2018 | Baker et al. | |
| 10,510,228 | B2 | 12/2019 | Baker et al. | |
| 11,357,439 | B1* | 6/2022 | Fischell | A61B 5/7235 |
| 2010/0301998 | A1 | 12/2010 | Marszalek et al. | |
| 2012/0032796 | A1* | 2/2012 | Jarrett | G08B 21/24 |
| | | | | 340/539.11 |
| 2014/0059828 | A1 | 3/2014 | Reynolds et al. | |
| 2014/0111333 | A1* | 4/2014 | Haas | G08B 23/00 |
| | | | | 340/539.11 |
| 2014/0248863 | A1* | 9/2014 | Golsch | H04W 4/40 |
| | | | | 455/418 |
| 2016/0307415 | A1 | 10/2016 | Marszalek | |
| 2016/0328081 | A1* | 11/2016 | Vilermo | H04M 1/271 |
| 2017/0148288 | A1 | 5/2017 | Baker et al. | |
| 2018/0260587 | A1 | 9/2018 | Peacock | |
| 2018/0276964 | A1* | 9/2018 | Yang | G08B 13/2448 |
| 2018/0286195 | A1 | 10/2018 | Baker et al. | |
| 2019/0066468 | A1 | 2/2019 | Burmeister, II | |
| 2020/0090476 | A1 | 3/2020 | Baker et al. | |
| 2020/0347648 | A1* | 11/2020 | Moock | E05B 47/0012 |
| 2022/0028233 | A1 | 1/2022 | Baker et al. | |

OTHER PUBLICATIONS

International Preliminary Report on Patentability of the International Bureau cited in corresponding application No. PCT/US2022/019364; Sep. 21, 2023; 6 pp.

\* cited by examiner

MULTI-ALARM MONITORING OF ELECTRONIC MERCHANDISE

CROSS-REFERENCE TO RELATED APPLICATION

This application claims the benefit of U.S. provisional application entitled "MULTI-ALARM MONITORING OF ELECTRONIC MERCHANDISE", filed Mar. 8, 2021, and assigned Ser. No. 63/158,154, the entire disclosure of which is hereby expressly incorporated by reference.

BACKGROUND OF THE DISCLOSURE

Field of the Disclosure

The disclosure relates generally to security monitoring of electronic merchandise on display.

BRIEF DESCRIPTION OF RELATED TECHNOLOGY

Product merchandise is routinely displayed in retail environments with a security mechanism to deter theft. In some cases, the security mechanism is a tether that ties the merchandise to a display fixture. In other cases, the security mechanism is a security device, such as an electronic tag, affixed to the product and configured to support a proximity detection scheme. In either case, the security mechanism attempts to deter theft while providing a consumer an opportunity to evaluate the product. For instance, the security device may allow the consumer to lift or otherwise inspect the product to assess its function and/or aesthetics. Allowing the consumer to lift the product gives the consumer a better opportunity to assess the weight and feel of the product, as well as interact with the various features and other aspects of the product. Despite allowing for such interaction, security devices and other security mechanisms may nonetheless undesirably restrict or inhibit consumer evaluation of the merchandise.

SUMMARY OF THE DISCLOSURE

In accordance with one aspect of the disclosure, a system for security monitoring of an electronic device on retail display includes a transmitter configured to transmit a signal, a sensor configured for attachment to the electronic device, the sensor being configured to generate a security event notification based on whether the signal is detected by the sensor, and an alarm controller configured to generate a plurality of alarms upon receipt of the security event notification from the sensor, the plurality of alarms including an audible alarm and a message alarm. The alarm controller is further configured to send the message alarm to initiate a user interface lock on the electronic device in response to the message alarm. The alarm controller is configured to operate in a silent mode in which the audible alarm is not generated upon receipt of the security event notification.

In accordance with another aspect of the disclosure, a method for security monitoring of an electronic device on retail display includes receiving, by a processor of an alarm controller, a security event notification from a sensor attached to the electronic device, and generating, by the processor of an alarm controller, one or more of a plurality of alarms in response to the security event notification, the plurality of alarms including an audible alarm and a message alarm. Generating the one or more of a plurality of alarms includes sending, by the processor of the alarm controller, the message alarm to a server computer to initiate a user interface lock on the electronic device. Generating the one or more of a plurality of alarms includes, operating, by the processor of the alarm controller, in a silent mode in which the audible alarm is not generated upon receipt of the security event notification.

In accordance with another aspect of the disclosure, a method for security monitoring of an electronic device on retail display includes receiving, by a server computer of a security system, a message alarm from an alarm controller of the security system configured to generate a plurality of alarms in response to a security event notification, the plurality of alarms including an audible alarm and the message alarm, and initiating, by the server computer, a user interface lock on the electronic device in response to the message alarm. The alarm controller is configured to operate in a silent mode in which the audible alarm is not generated upon receipt of the security event notification.

In connection with any one of the aforementioned aspects, the devices, methods, and systems described herein may alternatively or additionally include any combination of one or more of the following aspects or features. The alarm controller is further configured to automatically deactivate each alarm of the plurality of alarms upon receipt of a further notification from the sensor that a security event based on whether the signal is detected by the sensor has been corrected. The alarm controller is configured to send a further message to a server computer to terminate the user interface lock upon receipt of the further notification. The alarm controller is further configured to, in response to the further notification, automatically reset and re-arm in preparation for further security monitoring. The alarm controller includes an alarm control unit, the alarm control unit including a user interface button to deactivate the audible alarm. The method further includes automatically deactivating, by the processor of the alarm controller, each alarm of the plurality of alarms upon receipt of a further notification from the sensor that a security event based on whether the signal is detected by the sensor has been corrected. The method further includes sending, by the processor of the alarm controller, a further message to the server computer to terminate the user interface lock upon receipt of the further notification. The method further includes, in response to the further notification, automatically implementing, by the processor of the alarm controller, a reset and re-arm procedure in preparation for further security monitoring. The method further includes deactivating, by the processor of the alarm controller, the audible alarm in response to actuation of a user interface button. The method further includes configuring, via a user interface of the alarm controller, the alarm controller to operate in a keyless mode in which the user interface button is operable to deactivate the audible alarm. The method further includes configuring, via a user interface of the alarm controller, the alarm controller to operate in the silent mode. The method further includes receiving, by the server computer, a further message from the alarm controller to terminate the user interface lock due to correction of a security event underlying the message alarm.

BRIEF DESCRIPTION OF THE DRAWING FIGURES

For a more complete understanding of the disclosure, reference should be made to the following detailed description and accompanying drawing figures, in which like reference numerals identify like elements in the figures.

The disclosed devices, methods, and systems are susceptible of embodiments in various forms. Specific embodiments of the invention are illustrated in the drawing (and will hereafter be described) with the understanding that the disclosure is intended to be illustrative, and is not intended to limit the invention to the specific embodiments described and illustrated herein.

DETAILED DESCRIPTION OF THE DISCLOSURE

Systems, devices and methods for multi-alarm security monitoring of electronic devices on display are described. The security monitoring provided by the disclosed methods and systems include the locking of a user interface of the electronic device itself. The retail environment may consequently not need to rely on tethers, security tags, proximity sensors, or other security mechanisms to deter theft. The user interface locking also allows one or more audible alarms to be deactivated. That is, an alarm controller of the disclosed systems may operate in a silent mode in which an audible alarm is not generated because the user interface locking provides an adequate level of security. In some cases, one or more other alarms may still be generated when the alarm controller is operating in the silent mode, including audible alarms generated by other devices (e.g., an audible whine generated by a sensor attached to the electronic device). The silent mode of operation may provide a convenient way to maintain a sufficient level of theft deterrence while not disturbing the retail environment with each instance of a trigger event, most of which are associated with false alarms.

The user interface locking may make additional functionality of the alarm controller possible. As described herein, the alarm controller may be configured to automatically deactivate one or more alarms, including the user interface locking. The alarm controller may thus be configured to self-heal in the event of a correction of a security event trigger. The alarm controller may then re-arm and otherwise reset in preparation for further security monitoring. Such self-healing may be useful in scenarios in which false alarms are common. The self-healing avoids forcing personnel managing the retail environment to manually reset the alarm controller. Alternatively or additionally, the alarm controller may be configured to operate in a keyless mode in which user interaction with the alarm controller does not require a key. Instead, for example, a user may interact with an alarm control unit of the disclosed system via one or more user interface buttons.

The disclosed systems, devices and methods are not limited to any particular type of electronic merchandise or type of retail environment or site. The integrated nature of the disclosed devices and methods allows the nature of the retail environment to vary considerably. For instance, the retail site may be a kiosk rather than a standalone store with a dedicated entrance or exit. The nature of the electronic merchandise may also vary considerably. While the disclosed systems, devices and systems may be useful in connection with smartphones and other portable electronic devices, the electronic devices may or may not be handheld or portable. For instance, the disclosed systems, devices and methods may be useful in connection with televisions and other large scale devices.

Figure 1:
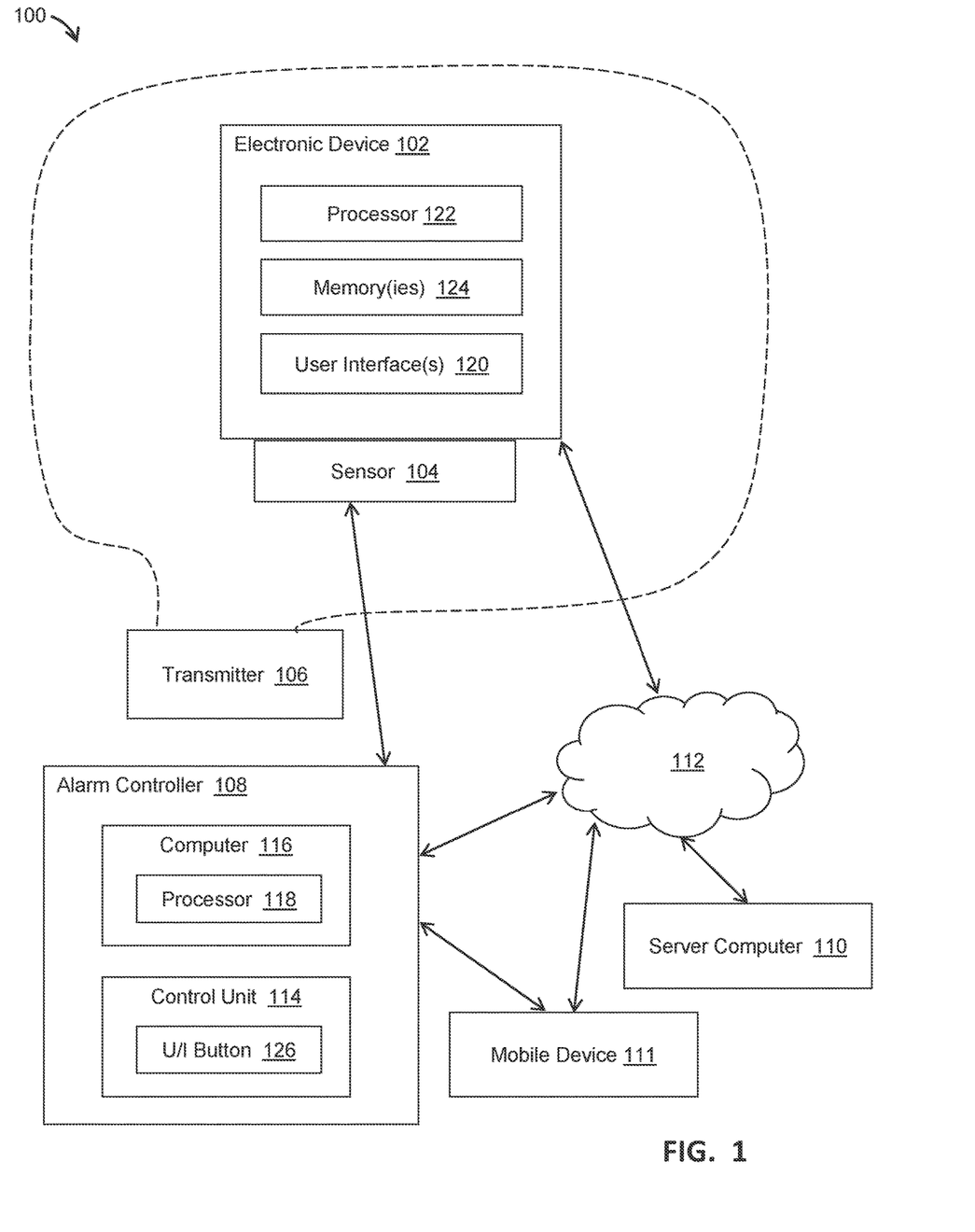
FIG. 1 is a block diagram of a system for multi-alarm security monitoring of an electronic device on retail display in accordance with one example.

Turning to the drawing figures, FIG. 1 depicts a system 100 of security monitoring for an electronic device 102 in accordance with one example. The electronic device 102 may be merchandise for sale and/or part of an exhibit or other display of items for sale. For example, the electronic device 102 may be a smartphone, tablet, or laptop computer. The electronic device 102 may or may not be considered to be or include a computer or computing device. For instance, the electronic device 102 may be a television or monitor. The size, form factor, and other characteristics of the electronic device 102 may thus vary considerably.

The system 100 may be integrated with any type of retail display. The retail display may be in a store or other site or environment. The retail display may include one or more fixtures, such as a display stand, base, etc. Such fixtures may or may not physically restrict movement the electronic device 102 within the store or other retail environment. For example, tethers or other cable-based security measures may be used, including, for instance, cable-based apparatus having a retractable reel and other components for securing merchandise to a display fixture as described in U.S. Patent Publication No. 2014/0059828 ("Apparatus, System and Method for Securing, Attaching and/or Detaching a Device to a Fixture"), the entire disclosure of which is hereby incorporated by reference.

The system 100 includes a number of components directed to providing security monitoring functionality in addition or alternative to such fixtures. One or more of the components may be located at the retail site. The functionality is configured to establish one or more zones within the retail site. The zones generally allow individuals to pick up and interact with the electronic device 102. In some cases, the zones define a space in which the electronic device 102 may be moved without triggering the alarm(s), such as an area near a display table. Alternatively or additionally, the zones define a space in which entry of the electronic device 102 triggers the alarm(s), such as an area near a store exit.

In the example of FIG. 1, the system 100 includes a sensor 104, one or more transmitters or emitters 106, and an alarm controller 108, to provide the proximity zone functionality. The sensor 104 is attached to the electronic device 102. Each transmitter 106 is configured to transmit a signal (e.g., a wireless signal or other electromagnetic field) to define a zone. The sensor 104 is configured to generate a security event notification based on whether the signal is detected by the sensor 104. In this example, the electronic device 102 and the sensor 104 are disposed within the zone under normal circumstances. A security event is triggered when the sensor 104 is no longer able to detect the signal from the transmitter 106 as a result of being disposed outside the zone. In other cases, a security event is triggered when the sensor 104 detects the signal.

The alarm controller 108 is configured to generate a plurality of alarms or alerts upon receipt of the security event notification from the sensor 104. In one example, the alarms include an audible alarm (e.g., a storewide audible alarm) and a whine emitted by the sensor 104. Additional or alternative alarms may be generated. For example, any digital recording (e.g., wave file, MP3, and the like) or audio prompts/messages may be generated, and those recordings and prompts/messages may be triggered off of different events or triggers, included those described below.

The alarm controller 108 may include an alarm control unit 114 to generate and/or control the alarms. For instance, the storewide or other audible alarm may be generated directly or indirectly by the alarm control unit 114. The alarm control unit 114 may provide a user interface for activating the security monitoring (e.g., arming the system 100), deactivating alarms, and/or otherwise controlling the alarms. In the example of FIG. 1, the alarm controller 108 further includes a computer 116 having a processor 118 for still further configuration and control of the system 100. The computer 116 may be configured to generate one or more message alarms, including, for instance, text message alerts, email alerts, and other alerts, such as alerts to a server or other component of the system 100 as described below. Alternatively or additionally, the alarm control unit 114 is configured to generate the message alarms. The control unit 114, the computer 116, and the processor 118 may be integrated with one another, and/or other components of the alarm controller 108 to any desired extent.

Further details regarding the wireless security monitoring provided via the proximity zones are provided in U.S. Patent Publication No. 2016/0307415 ("Apparatus, System and Method for Monitoring a Device within a Zone"), the entire disclosure of which is hereby incorporated by reference. The number, arrangement, configuration, and other characteristics of the transmitters, the proximity zones, and other components or aspects of the wireless security monitoring may accordingly vary from the example shown.

The system 100 also includes a server computer 110 configured to support security functionality provided by the electronic device 102 itself. Such security functionality involves or otherwise includes the locking a user interface 120 of the electronic device 102. Such security functionality augments the security measures implemented by the other components of the system 100 in the retail environment, such as the transmitter 106 and the alarm controller 108. For instance, the security functionality may provide redundancy, which may be useful in circumstances in which a site system fails or is otherwise disabled, or when the cutting of a tether or cable is not detected. Alternatively, the security functionality may serve as a replacement for tethers, cables or other physical measures, e.g., in systems in which the electronic device 102 is disposed in a tether-free display.

The server computer 110 may be located locally or remotely. In this example, the server computer 110 communicates with other components of the system 100, such as the alarm controller 108, via a network 112. The network 112 may be or otherwise include any number of local, private, public, or other networks, such as a local area network and the internet.

The server computer 110 also communicate with the electronic device 102 via the network 112 to support the implementation of the user interface locking security functionality. The user interface lock may be triggered by a trigger event detected by the electronic device 102 itself and/or by another component of the system 100. In the former case, the electronic device 102 may be configured to self-monitor for trigger events, such as various types of disconnections (e.g., power, data, etc.) or movement indicative of a theft attempt (e.g., GPS-based geofence). In the latter case, the server computer 110 may direct the electronic device 102 to lock the user interface 120 as a result of an alarm message generated by the alarm controller 108.

Further details regarding one example of the security functionality are provided in U.S. Patent Publication No. 2018/0260587 ("Integrated, Persistent Security Monitoring of Electronic Merchandise"), the entire disclosure of which is hereby incorporated by reference. Briefly, the electronic device 102 includes a processor 122 that executes security monitoring instructions stored on one or more memories 124. The processor 122 may be or include the central or primary processor of the electronic device 102. The memories 124 may include any number of memory units and/or storage devices, including persistent memory (e.g., firmware). As described in above-referenced disclosure, persistence of the security functionality may be established via use of boot instructions stored on the memory 124. In such cases, the boot instructions are executed by the processor 122 during a boot sequence of the electronic device 102 to initiate the security functionality. The security functionality may be provided via security monitoring instructions stored in a non-persistent unit of the memory 124, such as a storage device. The execution of the boot instructions during the boot sequence initiates execution of the security monitoring instructions. For example, the boot instructions may include one or more subroutine or other calls or other references to the security monitoring instructions. The security monitoring functionality is thus initiated upon any rest or restart of the electronic device 102. Alternative or additional techniques for supporting the user interface locking functionality may be used, including, for instance, techniques in which the security instructions are stored in persistent memory and/or techniques in which the security instructions are integrated with the operating system to any desired extent.

The processor 122 is configured, via the execution of the security monitoring instructions, to monitor the retail display of the electronic device 102 for a security trigger event. The monitoring for the security trigger event may use one or more components of the electronic device 102. For example, the electronic device 102 may include an accelerometer or other sensor configured to detect and characterize movement. One or more antennas or other electromagnetic circuitry of the electronic device 102 may be used to detect or determine distances or position (e.g., GPS-based position). The monitoring may also involve detecting a disconnection at one or more ports or interfaces of the electronic device 102, such as accessory/input ports and a power port, or disconnection from a wireless power supply, such as an induction charger. Examples of trigger events involving such sensors and circuitry include removing the electronic device 102 from a proximity zone, moving the electronic device 102 is in a manner indicative of theft, or one or more disconnections of the electronic device 102, such as disconnection form a power source, either wired or wireless. Still other types of trigger events may alternatively or additionally be used, including, for instance, a change in the detection of one or more wireless networks and other aspects of the operation of the electronic device (e.g., (i) an attempt to delete or disable an application, firmware, or other monitoring instructions, (ii) discontinue a monitoring service, (iii) detach an agent of the monitoring service, or (iv) power-off the electronic device 102).

The monitoring for a trigger event may also involve communications or other interaction with another device. For example, the electronic device 102 may receive a signal or message from the alarm controller 108, the server computer 110, and/or other security system component indicative of an alarm condition within the retail store. For instance, in some cases, the alarm controller 108 sends an alarm message to the server computer 110, which, in turn, sends a message to the electronic device 102. The alarm message may be in response to an alarm condition detected by the sensor 104 attached to the electronic device 102 or another electronic device in the retail store. An attempted theft of other merchandise in the retail environment may thus lock down other merchandise on display. The communications involving the alarm message may vary. For instance, in some cases, the alarm message generated by the alarm controller 108 may be sent via the network 112 to the electronic device 102, without involving the server computer 110 or another component of the system 100.

Upon receipt of a message regarding, or other detection of, the trigger event, the execution of the security monitoring instructions causes the processor 122 to lock the user interface(s) 120 of the electronic device 102. For instance, a touchscreen or other display may display a warning message regarding a locking of the electronic device 102 until the trigger event ends. The warning message may continue to be displayed until the trigger event is no longer present. The nature of the locking may vary with the type of trigger event, as described in the above-referenced patent publication.

The availability of, and reliance on, the user interface locking functionality provides operational flexibility and options for the other components of the system 100. Such operational flexibility may address a number of security-related challenges presented in the retail environment. For instance, the alarm controller 108 (or a portion thereof, such as the control unit 114) may typically be configured to require a key for user interaction. In some cases, the key is or includes an electronic key with an embedded 64-bit chip. In other cases, the key may be a logical key (e.g., user log-in and privilege based using a web user interface or application that interacts with and controls the system). The key may be inserted into the alarm controller 108 by an operator (e.g., a store manager) to reset or disarm the alarm controller 108. In such cases, with each alarm condition, the operator is forced to return to the location of the alarm controller 108 (e.g., often in the rear or other secluded or limited access part of the store, such as in a locked cabinet), find the key, and insert the key into the alarm controller 108. Meanwhile, the audible alarm generated by the alarm controller 108 may be blaring throughout the entire store. When the interaction with the alarm controller 108 is problematic, the audible alarm may become an undesired distraction, especially when the alarm condition is a false alarm. The key may present a number of problems in such situations, including, for instance, when the key is lost, stolen or misplaced. To avoid such problems, the user interface locking functionality is relied upon to allow the alarm controller 108 to be configured for operation in one or more modes, including, a keyless mode and a silent mode. Further details regarding the operational mode(s) is provided below in connection with a number of examples.

The alarm controller 108 is configured to operate in a silent mode in which the audible alarm is not generated upon receipt of the security event notification. In such cases, the sensor 104 still generates a security event notification based on whether the signal is detected by the sensor 104. For instance, as described above, the sensor 104 may generate the notification when the sensor 104 is unable to detect the signal from the transmitter 106. Alternatively, the sensor 104 may detect the signal from the transmitter 106. In either case, while in the silent mode, the alarm controller 108 responds to the notification by generating the message alarm to initiate the user interface locking. The message alarm is sent as a replacement for the audible alarm. As described above, the message alarm may be sent to the server computer 110 and/or another component of the system 100, including, for instance, the electronic device 102. The alarm controller 108 may generate one or more alarms in addition to the message alarm, such as message alarms sent to other devices or systems. For example, the additional alarms may involve transmission of one or more email or text messages.

The alarm controller 108 may operate in a normal mode instead of the silent mode. The alarm controller 108 may include a user interface that provides the operator with an option to select the operational mode—e.g., silent mode or normal mode. In the example of FIG. 1, the user interface may be provided by the computer 116 and/or the control unit 114. In the normal mode, the alarms generated by the alarm controller 108 may include the audible alarm (e.g., a store-wide audible alarm).

The alarm controller 108 may be configured to operate in a keyless mode in which one or more alarms may be deactivated without requiring operator insertion of a key. Instead, a user interface of the alarm controller 108 may provide the operator with an option to deactivate the alarm. For instance, in the example of FIG. 1, the alarm control unit 114 is configured to provide, or otherwise include, a user interface button 126 for deactivation of the audible alarm (and/or other alarms). In some cases, the user interface button 126 is rendered on a display. Alternatively or additionally, the user interface button 126 is a push button or other physical switch disposed on a panel (e.g., front panel) or other portion of a housing of the control unit 114. In other cases, the user interface button 126 is generated or otherwise provided by the computer 116 or other component of the alarm controller 108. In addition to the physical user interfaces described above, a web-based user interface may be used to securely interact with the alarm controller 108 (which may be connected to a server via a robust internet of things (IoT) connection, such as Wi-Fi default with cellular fallback and battery backup). Alternatively, the user interface may be, involve, or otherwise include a mobile application (e.g., mobile app) implemented on a mobile device 111 (e.g., a mobile phone). The mobile app may be used to securely connect and interact remotely with the alarm controller 108 (e.g., through the cloud and/or the network 112) or directly with the alarm controller 108 through a local connection with the mobile device 111 (e.g., a Bluetooth connection). In the latter case, no IoT connection may be used. The web-based user interface or the mobile app may also act as a "key" in an otherwise keyless system by managing user log-ins and limiting access to different features of the system, such as status and control. In this regard, an operator is able to "remotely" manage and control the system (i.e., without having to physically interact with the alarm controller 108).

The alarm controller 108 may be configured to automatically deactivate each alarm of the multiple alarms. The alarms may be deactivated upon receipt of a further notification from the sensor 104. The further notification may be indicative of the correction of the security event that gave rise to the alarm condition. The security event may be based on whether the signal from the transmitter 106 is detected by the sensor 104. In the example of FIG. 1, the correction may involve or include the sensor 104 detecting the signal once again. In other cases, the correction may involve or include the sensor 104 no longer detecting the signal. The manner in which the security event is corrected may vary in accordance with the nature of the security event and alarm condition.

The automatic deactivation by the alarm controller 108 may include removal of the user interface lock. For instance, upon receipt of the further notification regarding correction of the security event, the alarm controller 108 may be configured to send a further message to the server computer 110 to terminate the user interface lock.

The automatic deactivation of the alarms may be part of a self-healing or automatic reset procedure implemented by the alarm controller 108. The reset procedure may be implemented in response to the further notification regarding correction of the security event. In some cases, implementation of the reset procedure by the alarm controller 108 automatically resets and re-arms the alarm controller 108. The alarm controller 108 may thus be prepared for further security monitoring.

Figure 2:
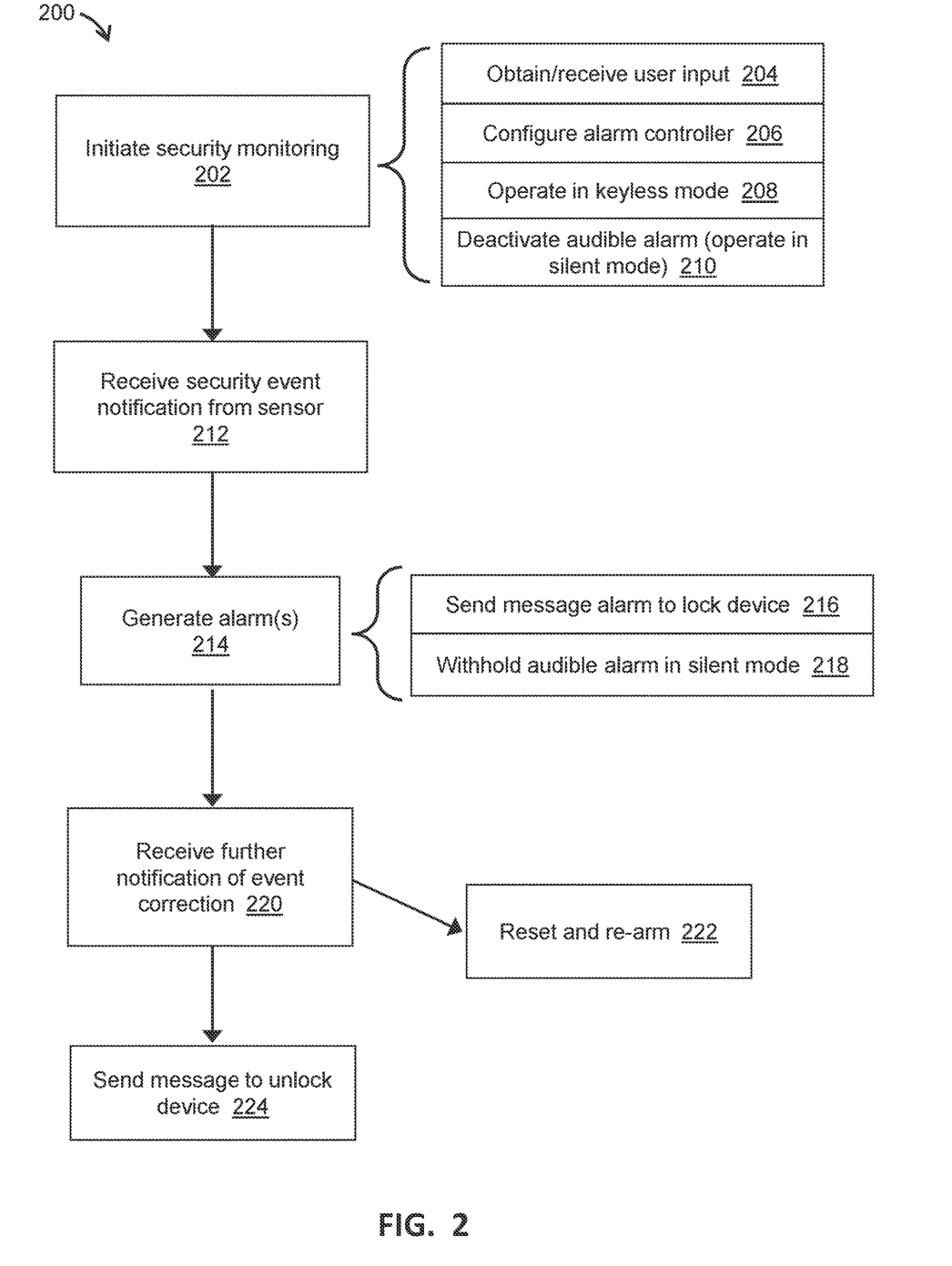
FIG. 2 is a flow diagram of a method implemented by an alarm controller for multi-alarm security monitoring of an electronic device on retail display in accordance with one example.

FIG. 2 is a flow diagram of a method 200 of monitoring an electronic device on retail display. The method 200 is implemented by a processor of an alarm controller and/or other processor of a security system, such as the system 100 of FIG. 1. The processor may be located at the retail site. For instance, the method 200 may be implemented by the processor 118 of the alarm controller 108 described above in connection with FIG. 1. Other processors and/or alarm controllers may be used.

The method 200 may begin with an act 202 having one or more steps or procedures directed to initiating security monitoring. For example, one or more user inputs may be received in an act 204. The user inputs may be provided via various types of user interfaces, such as a touchscreen, push button(s), and a keyboard. The steps or procedures may be directed to an act 206 in which the alarm controller or a component thereof is configured. In some cases, the configuration may include selecting, via a user interface of the alarm controller, an operational mode for the alarm controller, including, for instance, a keyless mode in an act 208 or a silent mode in an act 210. In some cases, the keyless, silent, or other operational mode may be entered during a startup sequence of the alarm controller, such as when the system is rebooted. For example, the startup sequence may provide an option via a pop-up or other user interface element rendered via a display. The pop-up may prompt or force the operator to insert an electronic key, enter a passcode, and/or perform one or more other authentication steps to enable entry into the keyless or other operational mode. In another example, the operator may not be forced to enter an electronic key or passcode in order to enter the keyless mode.

The configuration in the act 210 may include deactivation of one or more alarms, such as an audible alarm. In some cases, the audible alarm is deactivated in response to actuation of a user interface button. For instance, operation in the keyless operational mode may allow the user interface button to be operable to deactivate the audible alarm.

In an act 212, a security event notification is received from a sensor attached to the electronic device. The security event notification may be indicative of a security event detected by the sensor. As described above, the sensor may detect the security event based on whether the sensor detects a signal transmitted by a transmitter.

One or more alarms of a plurality of alarms are then generated in an act 214 in response to the security event notification. The plurality of alarms include at least one audible alarm and at least one message alarm. In some cases, multiple types of message alarms are generated, including, for instance, alarm messages sent via email and/or text messages. In the example of FIG. 2, the act 214 includes an act 216 in which one of the message alarms is sent to a server computer to initiate a user interface lock on the electronic device. The act 214 further includes withholding or otherwise not generating one of the audible alarms (e.g., a main audible alarm) in an act 218 while the alarm controller resides or operates in a silent mode. The audible alarm is therefore not generated upon receipt of, or in response to, the security event notification. In another example, other types of digital recordings and/or audio messages may be generated based on the selected operational mode for the alarm controller, as described above. In one example, audio messages may be customized for each end user or application and remotely updated/pushed to the alarm controller.

The method 200 may include an act 220 in which a further notification is received from the sensor. The further notification may indicate that a security event based on whether the signal is detected by the sensor has been corrected. Once the further notification is received, each alarm may be automatically deactivated in an act 222, and a further message may be sent to the server computer in an act 224 to terminate the user interface lock. The deactivation of the alarms may be performed without requiring an operator to insert a key. The act 222 may also include automatically implementing a reset and re-arm procedure in preparation for further security monitoring. The reset and re-arm procedure may also be implemented without requiring an operator to insert a key.

The order of the acts of the above-described method 200 may differ from the example shown in FIG. 2. For instance, one or more acts related to the configuration of the alarm controller may be implemented concurrently with, or after, the receipt of a security event notification.

Figure 3:
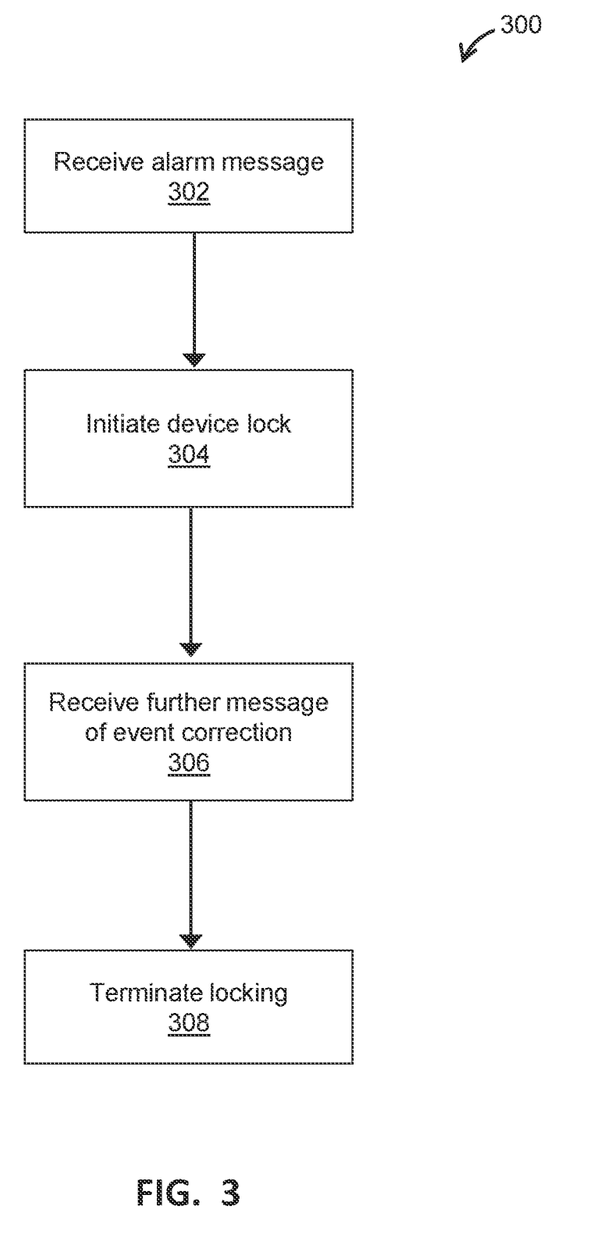
FIG. 3 is a flow diagram of a method implemented by a computer server for multi-alarm security monitoring of an electronic device on retail display in accordance with one example.

FIG. 3 depicts a method 300 for security monitoring of an electronic device on retail display. The method 300 is implemented by a processor of a server computer and/or other processor of a security system, such as the system 100 of FIG. 1. The processor may be located at or remotely from the retail site. For instance, the method 300 may be implemented by a processor of the server computer 110 described above in connection with FIG. 1. The server computer may be configured for implementation and/or support of the user interface locking functionality described herein and in the above-referenced patent publication. Other processors and/or server computers may be used.

The method 300 may begin with a number of acts directed to initiating the user interface locking functionality on the electronic device. Such acts may involve or otherwise include determining whether to initiate the user interface locking functionality. For instance, a database may be accessed to determine whether the electronic device is listed as a device for which the functionality is to be implemented. The acts may include a number of communications with the electronic device to start the execution of a service on the electronic device. The acts may also include one or more communications with an alarm controller at the retail site.

In an act 302, a message alarm is received from the alarm controller. The alarm controller is configured to generate a plurality of alarms in response to a security event notification, as described above. The plurality of alarms include an audible alarm and the message alarm. As described above, the alarm controller may be configured to operate in a silent mode in which the audible alarm is not generated upon receipt of the security event notification.

In response to the message alarm, a user interface lock is initiated on the electronic device in an act 304. The user interface lock may be initiated by sending an alert or other communication to the electronic device.

In the example of FIG. 3, the method 300 also includes an act 306 in which a further message is received from the alarm controller to terminate the user interface lock. The termination may be due to correction of a security event underlying the message alarm. The user interface lock may then be terminated in an act 308 by sending another communication to the electronic device.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A system for security monitoring of an electronic device on retail display at a retail site, the system comprising:
   a transmitter configured to transmit a signal;
   a sensor configured for attachment to the electronic device, the sensor being configured to generate a security event notification based on whether the signal is detected by the sensor;
   an alarm controller for the retail site, the alarm controller being spaced from the electronic device at the retail site, and being configured to generate a plurality of alarms upon receipt of the security event notification from the sensor, the plurality of alarms comprising an audible alarm and a message alarm; and
   a server computer in network communication with the alarm controller and the electronic device, the server computer being configured to instruct the electronic device to implement a user interface lock of the electronic device;
   wherein the alarm controller is further configured to send the message alarm to the server computer to initiate the user interface lock,
   wherein the alarm controller is configured to operate in a silent mode in which the audible alarm is not generated upon receipt of the security event notification,
   wherein the alarm controller comprises a user interface for deactivating the plurality of alarms in a keyless mode in which the plurality of alarms are deactivated without user insertion of a key into the alarm controller, and
   wherein entry into the keyless mode and the silent mode is enabled via user insertion of the key into the alarm controller.

2. The system of claim 1, wherein the alarm controller is further configured to automatically deactivate each alarm of the plurality of alarms upon receipt of a further notification from the sensor that a security event based on whether the signal is detected by the sensor has been corrected.

3. The system of claim 2, wherein the alarm controller is configured to send a further message to the server computer to terminate the user interface lock upon receipt of the further notification.

4. The system of claim 2, wherein the alarm controller is further configured to, in response to the further notification, automatically reset and re-arm in preparation for further security monitoring.

5. The system of claim 1, wherein the alarm controller comprises an alarm control unit, the alarm control unit comprising a user interface button to deactivate the audible alarm.

\* \* \* \* \*